United States Patent [19]
Lee

[11] Patent Number: 5,274,245
[45] Date of Patent: Dec. 28, 1993

[54] OPTICAL LIQUID LEVEL DETECTOR USING DUAL VARYING LIGHT EMITTERS

[76] Inventor: Thomas E. Lee, 5550 S. Dorchester Apt. 505, Chicago, Ill. 60637

[21] Appl. No.: 972,638

[22] Filed: Nov. 6, 1992

[51] Int. Cl.$^5$ ............................................. G01N 15/06
[52] U.S. Cl. ..................................... 250/577; 73/293
[58] Field of Search .............. 250/577, 576; 356/246, 356/440, 340, 342; 340/619; 73/293

[56] References Cited

U.S. PATENT DOCUMENTS 4,701,613  10/1987  Watanabe et al. ................... 250/577
4,733,095  3/1988  Kurahashi et al. ................. 250/577

Primary Examiner—David C. Nelms
Assistant Examiner—K. Shami

[57] ABSTRACT

A device for detecting a specific liquid level, that can be mounted externally on a transparent or translucent vessel wall, and is insensitive to ambient light. This device utilizes a single light detector and a pair of AC activated light sources. The light sources produce reflected light signals which, when balanced at the detector, cancel. When liquid is absent the light signals are balanced, and no signal is detected. When liquid is present the extra signal reflected by the meniscus causes the light signals to become unbalanced, and a signal is detected.

9 Claims, 3 Drawing Sheets

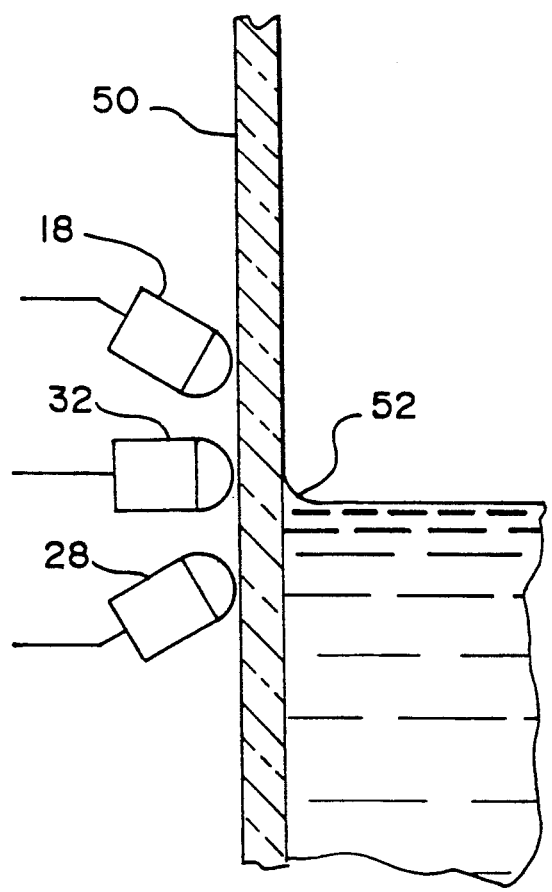

OPTICAL LIQUID LEVEL DETECTOR USING DUAL VARYING LIGHT EMITTERS

BACKGROUND—FIELD OF INVENTION

This invention relates to detection of a specific liquid level in vessels with transparent or translucent walls, such as plastic or glass vessels, or vessels with a sight gauge mounted for viewing liquid level.

BACKGROUND—DESCRIPTION OF PRIOR ART

Automation is a requirement if American industry is to successfully compete with industries overseas and to make products which can compete in overseas markets. In many industries, automation begins with automated monitoring of liquid levels in storage tanks and processing tanks. Most methods for detecting liquid level require that a detection device intrude into the vessel. Ultrasonic transducers, capacitance probes, conductivity probes etc. generally must be mounted within the vessel. Most optical devices used for level detection are also intrusive. Nearly all rely upon the change in the critical angle of refraction of some material which must be inserted into the vessel such that it comes in contact with the liquid to be detected. This is generally undesirable since many times the environment within the vessels is hostile to detection equipment, or detection equipment may contaminate vessel contents, and further more, mounting these devices is expensive in that it involves boring into the vessel.

Many level detection devices might seem to justify this intrusion into the vessel, difficulty of installation, and high cost, by producing a continuous reading of liquid level from empty to full. This continuous reading is usually used to activate a relay for control purposes when liquid level has obtained a specific level. The advantage of continuous liquid level output is to allow easy adjustment of that specific level.

At present no inexpensive liquid level detection apparatus exists which is designed to be retrofitted upon a sight glass. Many vessels in industry already have sight glasses and many more vessels in the future will have sight glasses as can be concluded by the large number of sight glass manufacturers. A retrofit able detection apparatus for a sight glass would provide an inexpensive method for an industrial plant to automate some plant functions and increase plant efficiency.

OBJECTS AND ADVANTAGES

Accordingly we claim the following as our objects and advantages of the invention: to provide a detection apparatus which does not intrude into the vessel but mounts on the exterior of a translucent or transparent vessel or mounts upon a sight glass, which is not sensitive to ambient light sources, and which can detect through the vessel wall or sight glass when the liquid level has reached a specific level. This detector can easily be remounted in a new position along the sight glass or the vessel wall in order to easily adjust the specific level which the device detects and therefore has the advantage of continuous level measuring devices without the disadvantages mentioned above.

BRIEF DESCRIPTION OF THE DRAWINGS

FIG. 3 shows the orientation of optical elements in relation to a vessel wall in the preferred embodiment.

LIST OF OBJECTS IN FIGURES

Figure 1:
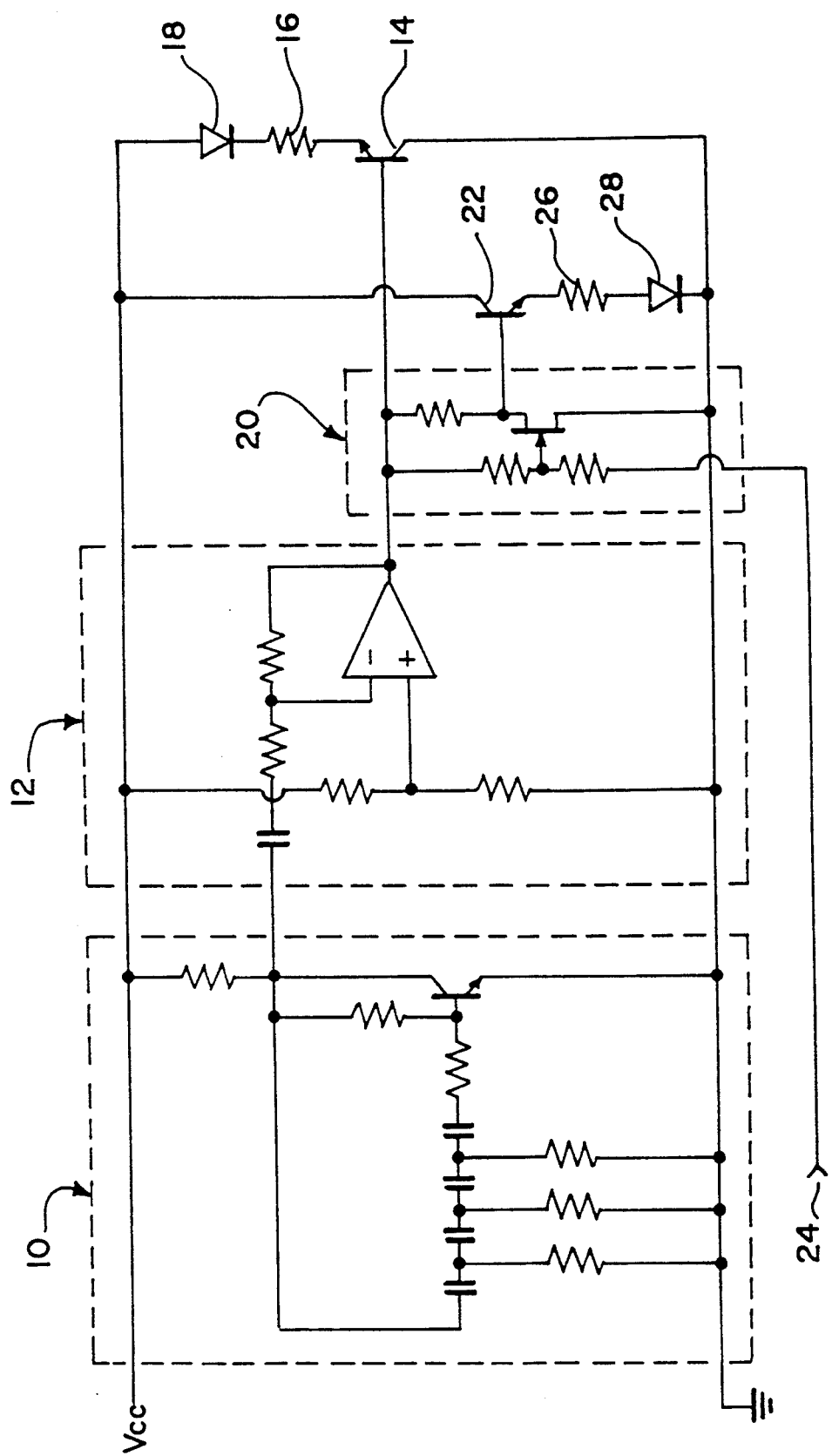
FIG. 1 Circuit diagram of transmitter for preferred embodiment

10. Oscillator
12. Amplifier circuitry to buffer oscillator 10
14. driver transistor for LED 18
16. driver resistor for LED 18
18. LED
20. Active voltage divider circuitry
22. Driver transistor for LED
24. Voltage input point to control active resistor divider circuitry 20
26. Driver resistor for LED 28
28. LED
32. Photo transistor
34. OpAmp which amplifies signal from Photo transistor 32
36. Parallel resistor and capacitor
38. Negative feed back circuitry
39. Voltage reference circuitry
40. Band pass amplifier
42. Peak detection circuitry.
43. Output
44. Voltage divider
50. Transparent or translucent vessel wall
52. Detection point

DESCRIPTION OF THE PREFERRED EMBODIMENTS

Figure 2:
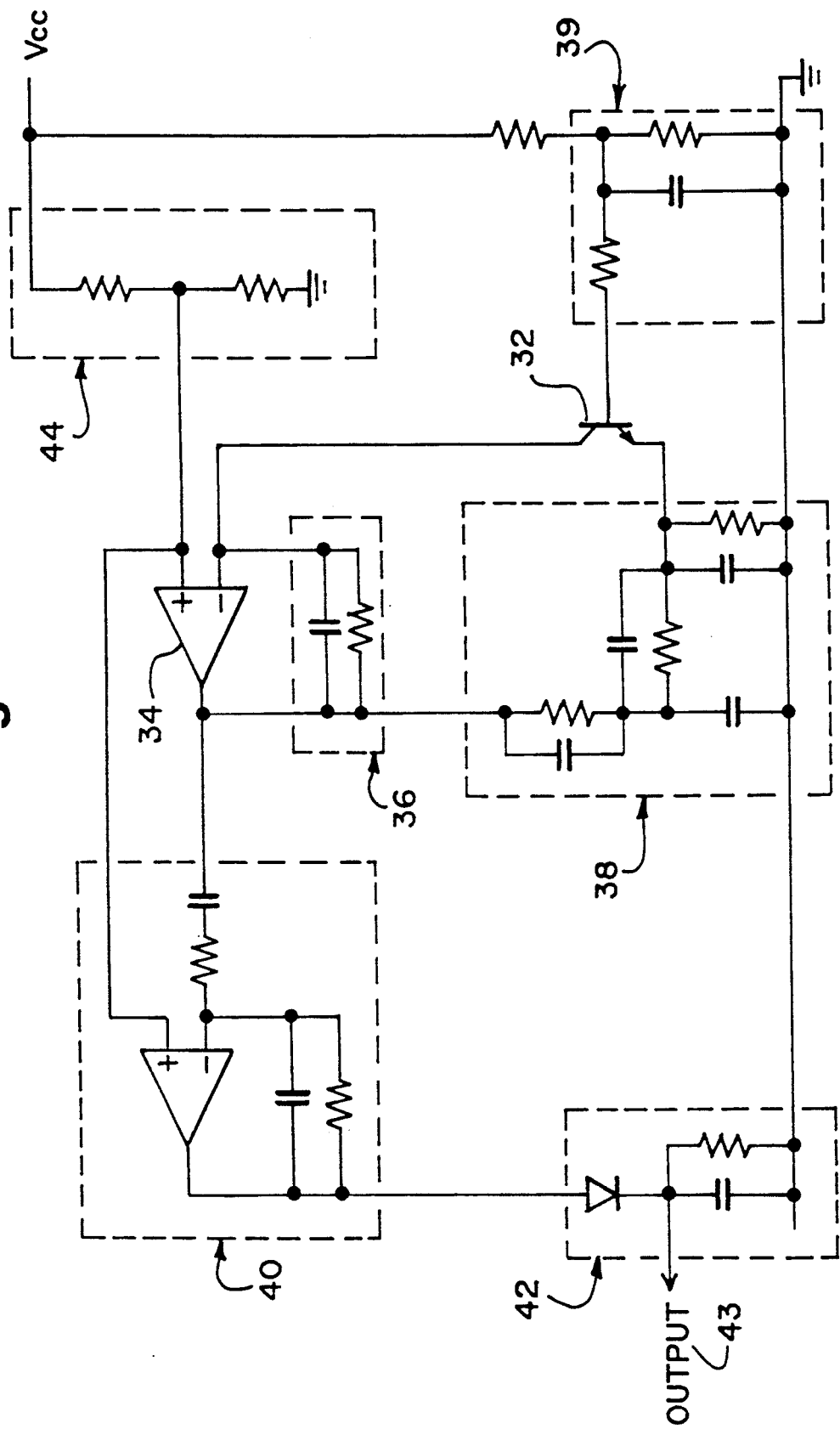
FIG. 2 Circuit diagram of receiver for preferred embodiment

A circuit diagram for the preferred embodiment is shown in FIG. 1 and 2. The transmitter is shown in FIG. 1 and the receiver is shown in FIG. 2. The transmitter includes the oscillator 10 which generates a sine wave with a high enough frequency to be easily distinguishable from ambient light sources. This sine wave is buffered and given the correct D.C. level through amplifier circuitry 12. Amplifier circuitry 12 directly drives transistor 14 which is in an emitter follower configuration. Transistor 14 and resistor 16 sink a sinusoidally varying current with a D.C. component from LED 18 such that the LED is always emitting light but light intensity will vary sinusoidally. Amplifier circuitry 12 also delivers the sine wave to active voltage divider circuitry 20 which drives transistor 22. Active voltage divider circuitry 20 allows the amplitude of the sine wave which drives transistor 22 to be controlled by an externally applied D.C. voltage designated "the balance voltage" which is applied at input 24. Transistor 22 and resistor 26 source a sinusoidally varying current with a D.C. component to LED 28 such that LED 28 is always emitting light but light intensity will vary sinusoidally. LED 28 and LED 18 produce, therefore, sinusoidally varying light signals which are 180 degrees out of phase with one another. Values for resistors 26 and 16 are chosen such that the amplitude of the sinusoidal light signal coming from LED 28 can be varied through a sufficient range so as to balance the sinusoidally varying component of the light signals coming from LED 28 and LED 18 as described below in the OPERATION section.

In the receiver, which is shown in FIG. 2, the signal from photo transistor 32 is amplified through OpAmp 34. The parallel resistor and capacitor 36 are chosen such that OpAmp 34 does not amplify signals lower than the frequency of the sine wave produced by the oscillator 10. Negative feed back circuitry 38 provides negative feed back of signals, such as those produced by ambient light, which are below or above the frequency produced by the oscillator 10. Voltage reference circuitry 39 provides a voltage reference at high impedance to the base of the photo transistor 32 for the correct operation of negative feedback circuitry 38. The signal produced from OpAmp 34 is further filtered and amplified through band pass amplifier 40. The peak signal from band pass amplifier 40 is detected by peak detection circuitry 42. When no signal is present of the correct frequency, peak detection circuitry 42 produces a D.C. voltage which is determined by voltage divider 44. When a signal is present of the correct frequency, peak detection circuitry 42 produces a D.C. voltage more positive than voltage divider 44. The signal from peak detection circuitry 42 can be tested at output 43.

The orientation of LED 18, LED 28 and photo transistor 32 are shown in FIG. 3. LED 18 and LED 28 are positioned above and below photo transistor 32, against a transparent or translucent vessel wall 50. LED 18 and LED 28 are aimed to emit light upon detection point 52 which is just on the inside of the transparent or translucent vessel wall. Photo transistor 32 is aimed to receive light from detection point 52.

OPERATION

The underlying principle by which this devices operates is that the two LEDs produce signals which, when balanced, cancel. In operation, the signals from the LEDs are adjusted so that they balance when no liquid is present at the detection level. When liquid is present at the detection level, more light is reflected from one LED than from the other and the signals are no longer balanced.

Therefore, before liquid can be detected, the balance voltage must be adjusted when the meniscus of the liquid level is not at the detection point. The balance voltage is adjusted so that the sine wave signals from LED 28 and LED 18, which are reflected back to the position of the photo transistor 32, cancel. The sine waves, which are 180 degrees out of phase with one another, can cancel when their amplitudes are the same. When the light signals from the two LEDs cancel, the photo transistor 32, Op Amp 34, and band pass amplifier 40 will have no signal of the proper frequency to amplify and detection circuitry 42 will produce the voltage determined by voltage divider 44.

When liquid to be detected is present at the detection level, the meniscus of the liquid at the detection point 52, reflects light to the photo transistor from one LED to a greater extent than light from the other LED. The sine waves are no longer balanced and therefore they do not cancel. The photo transistor 32, therefore detects a sine wave component from the LEDs, which is amplified by OpAmp 34 and Band pass amplifier 40 to produce a positive voltage from detection circuitry 42, which is larger than the voltage of voltage divider 44.

These alternating light intensities emitted by LED 18 and 28 need not be restricted to sinusoidal wave forms. Any set of wave forms f(t) and g(t) will work provided that there is some constant K where $f(t)+K*g(t)=C$ where C is a constant with respect to time, and there is some is some receiver which can distinguish f(t) and g(t) from ambient light. For example square waves which are 180 degrees out of phase can also be made to cancel, and the detection circuitry could include a commutating filter to pass this complex wave form.

SUMMARY

Thus the reader can see that the liquid level detector of the invention provides a highly sensitive detection scheme which is insensitive to ambient light, yet even a small imbalance between the two light sources can easily be detected by the tuned receiver. Since angles and position are not critical, detection can take place easily even through translucent vessel walls. Since alignment of optical elements is not critical and since no materials with special optical properties are required this liquid level detector provides an inexpensive to manufacture method for non-intrusively detecting liquid level.

What is claimed is:

1. An electro-optical liquid detector capable of sensing through a transparent or translucent vessel wall, the presence or absence of liquid at a specific level, comprising:
   a) two light emitting elements,
   b) a light detecting element,
   c) a means for energizing said light emitting elements such that one emits light which varies in intensity according to a function f(t), and the other emits light which varies in intensity according to a function g(t), where said functions f(t) and g(t) satisfy the condition that there is some constant k and some constant c such that $f(t)+k*g(t)=c$,
   d) a means of amplifying the signal from said light detecting element such that signals of the form f(t) and g(t) are amplified but not signals from ambient light sources,
   e) said light emitting elements and said light detecting elements are so positioned that a change in the liquid level to the detection level from any other level, will cause a change in the relative amount of light from said two light emitting elements reaching said light detecting element which is detectable by said amplifying means,
   f) some means for adjusting the amplitude of function g(t) so that the condition $f(t)+k*g(t)=c$ is fulfilled at the position of the photo detecting element when liquid level is not at said specific level.

2. The liquid level detection device of claim 1 wherein said function f(t) is a sine wave and said function g(t) is a sine wave 180 degrees out of phase with function f(t).

3. The liquid level detection device of claim 1 wherein said function f(t) is a square wave and said function g(t) is a square wave 180 degrees out of phase with function f(t).

4. The liquid level detection device of claim 1 wherein said function f(t) is a triangle wave and said function g(t) is a triangle wave 180 degrees out of phase with function f(t).

5. The liquid level detection device of claim 1 wherein said light emitting elements are LEDs.

6. The liquid level detection device of claim 1 wherein said light detecting element is a photo transistor.

7. The liquid level detection device of claim 1 wherein said transparent or translucent vessel wall is a sight gauge.

8. The liquid level detection device of claim 1 wherein said light emitting elements and said light detecting element are positioned such that one light emitting element is above, and the other light emitting element is below, said light detecting element.

9. The liquid level detection device of claim 8 wherein said light emitting elements are positioned to transmit light to, and said light detecting element is positioned to receive light from, an approximate location where the meniscus of the liquid to be detected contacts the vessel wall, when liquid is at said specific level.

* * * * *